(12) United States Patent
Chang

(10) Patent No.: US 9,987,693 B2
(45) Date of Patent: Jun. 5, 2018

(54) TABLE SAW HAVING A BLADE HEIGHT ADJUSTMENT MECHANISM

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 13 days.

(21) Appl. No.: 15/099,955

(22) Filed: Apr. 15, 2016

(65) Prior Publication Data

US 2017/0297122 A1    Oct. 19, 2017

(51) Int. Cl.
*B23D 45/06* (2006.01)

(52) U.S. Cl.
CPC ........... *B23D 45/068* (2013.01); *Y10T 83/773* (2015.04); *Y10T 83/7705* (2015.04); *Y10T 83/7726* (2015.04)

(58) Field of Classification Search
CPC .. B23D 45/068; B23D 45/067; B23D 45/062; Y10T 83/773; Y10T 83/7726; Y10T 83/7705
USPC ........................................................ 30/166.1
See application file for complete search history.

(56) References Cited

U.S. PATENT DOCUMENTS

| 8,517,413 | B2* | 8/2013 | Chen | B25H 1/04 248/370 |
| 2007/0044615 | A1* | 3/2007 | Chen | B23D 45/068 83/477.1 |
| 2011/0167976 | A1* | 7/2011 | Liu | B27G 19/02 83/102.1 |
| 2011/0271810 | A1* | 11/2011 | Brown | B23D 59/003 83/522.18 |

* cited by examiner

*Primary Examiner* — Laura M Lee

(57) ABSTRACT

A table saw includes a height adjustment wheel including a threaded shaft; a blade suspension mechanism secured to a lock crank; a rod secured to both the blade suspension mechanism and a bottom of the cutting surface; an electric motor including a driving shaft and a link extending forward to secure to the blade suspension mechanism; a circular saw blade operatively connected to the driving shaft; first and second mounting plates each secured to the link and including a slanted slot element; and an interconnection including two end holes moveably disposed in the slot elements of the first and second mounting plates respectively, and an intermediate threaded hole secured to the threaded shaft. A rotation of the height adjustment wheel moves the saw blade up or down.

1 Claim, 14 Drawing Sheets

US 9,987,693 B2

TABLE SAW HAVING A BLADE HEIGHT ADJUSTMENT MECHANISM

BACKGROUND OF THE INVENTION

1. Field of the Invention

The invention relates to table saws and more particularly to a table saw having a blade height adjustment mechanism with improved characteristics.

2. Description of Related Art

Table saw is a woodworking tool consisting of a circular saw blade, mounted on an arbor which is driven by an electric motor. The blade protrudes through the surface of a table, which provides support for the material (e.g., wood) being cut.

U.S. Pat. No. 6,820,527 entitled "table saw having a blade suspension structure" discloses a table saw having a blade suspension structure, comprising a work table formed with a cutting slot for passage of a circular blade; a suspension rod secured on the bottom of the work table and having a bottom face formed with a recessed flattened face; a motor gear box rotatably mounted on the suspension rod and located under the suspension rod, the motor gear box having a top face formed with a recess facing the flattened face of the suspension rod, wherein the recessed flattened face of the suspension rod is received in the recess of the motor gear box when the top face of the motor gear box touches the bottom face of the suspension rod; a swing seat pivotally mounted on the suspension rod; a rotation seat rotatably mounted on the swing seat by a pivot shaft, wherein the motor gear box is secured on the rotation seat to rotate therewith; and a threaded rod rotatably mounted on the swing seat, and having a first end rested on the rotation seat for pushing the rotation seat and a second end provided with a hand wheel which is used to rotate the threaded rod.

However, the patent is disadvantageous in use. For example, the threaded rod, the rotation seat, and the swing seat may displace undesirably when rotating the hand wheel to rise or lower the circular blade. And in turn, it may adversely affect precision when cutting a material.

Notwithstanding the prior art, the invention is neither taught nor rendered obvious thereby.

SUMMARY OF THE INVENTION

It is therefore one object of the invention to provide a table saw comprising a hollow, parallelepiped base including four panels, an upward curved slot member in the front one of the panels, and four corner posts; a folding leg assembly releasably secured to the corner posts and configured to support the base; an upper cutting surface releasably mounted on the base; a rip fence slidably mounted on the cutting surface; a saw guard mounted around an opening of the cutting surface besides the rip fence; a height adjustment wheel moveably mounted on the slot member and including a threaded shaft extending inward; a lock crank moveably mounted on the slot member and adjacent to the height adjustment wheel; a blade suspension mechanism secured to the lock crank; a rod secured to both the blade suspension mechanism and a bottom of the cutting surface; an electric motor including a driving shaft and a link extending forward to secure to the blade suspension mechanism; a circular saw blade operatively connected to the driving shaft and aligned with the opening of the cutting surface; a first mounting plate secured to the link and including a slanted slot element; a second mounting plate secured to the link and including a slanted slot element; and an interconnection including two end holes moveably disposed in the slot element of the first mounting plate and the slot element of the second mounting plate respectively, and an intermediate threaded hole secured to the threaded shaft; wherein either a rotation of the height adjustment wheel in a first direction moves two ends of the interconnection forward, upward along the slot elements respectively and moves the electric motor downward, or a rotation of the height adjustment wheel in a second direction moves the ends of the interconnection rearward, downward along the slot elements respectively and moves the electric motor upward, thereby adjusting height of the circular saw blade extending out of the opening of the cutting surface.

The above and other objects, features and advantages of the invention will become apparent from the following detailed description taken with the accompanying drawings.

DETAILED DESCRIPTION OF THE INVENTION

Figure 1:
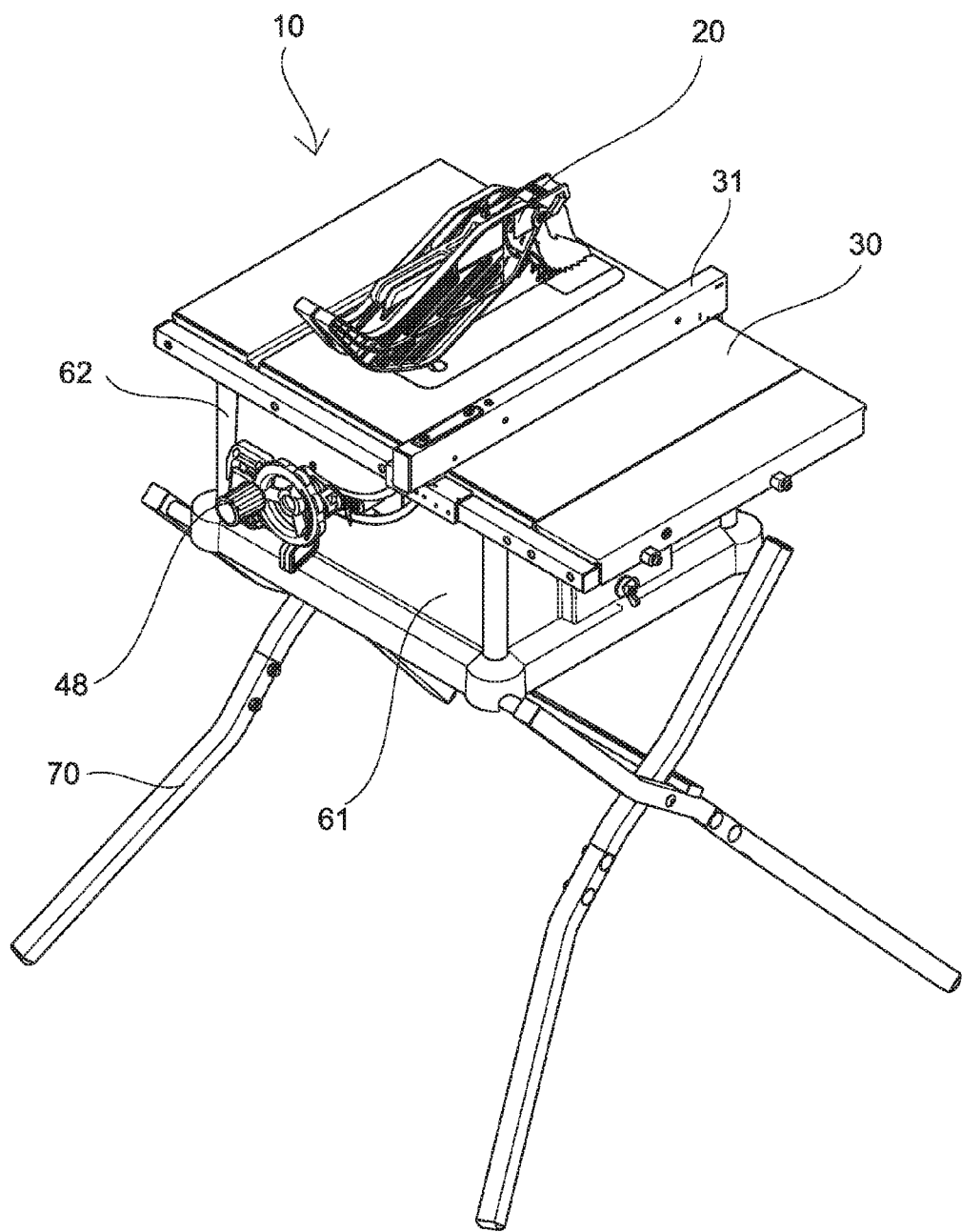
FIG. 1 is a perspective view of a table saw incorporating a blade height adjustment mechanism according to the invention.
Figure 2:
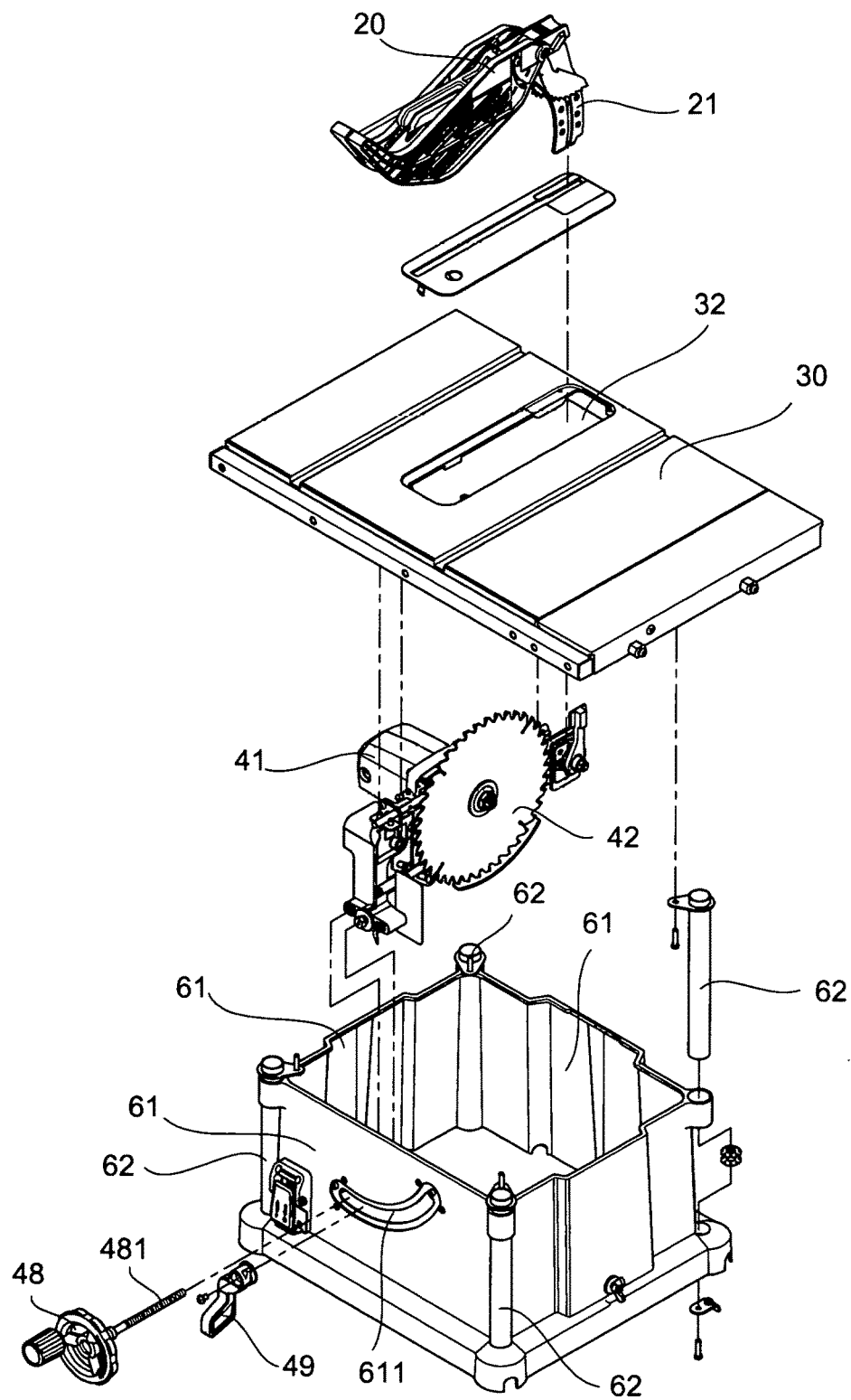
FIG. 2 is an exploded perspective view of the table saw with the saw assembly, and the blade height adjustment mechanism removed.
Figure 2A:
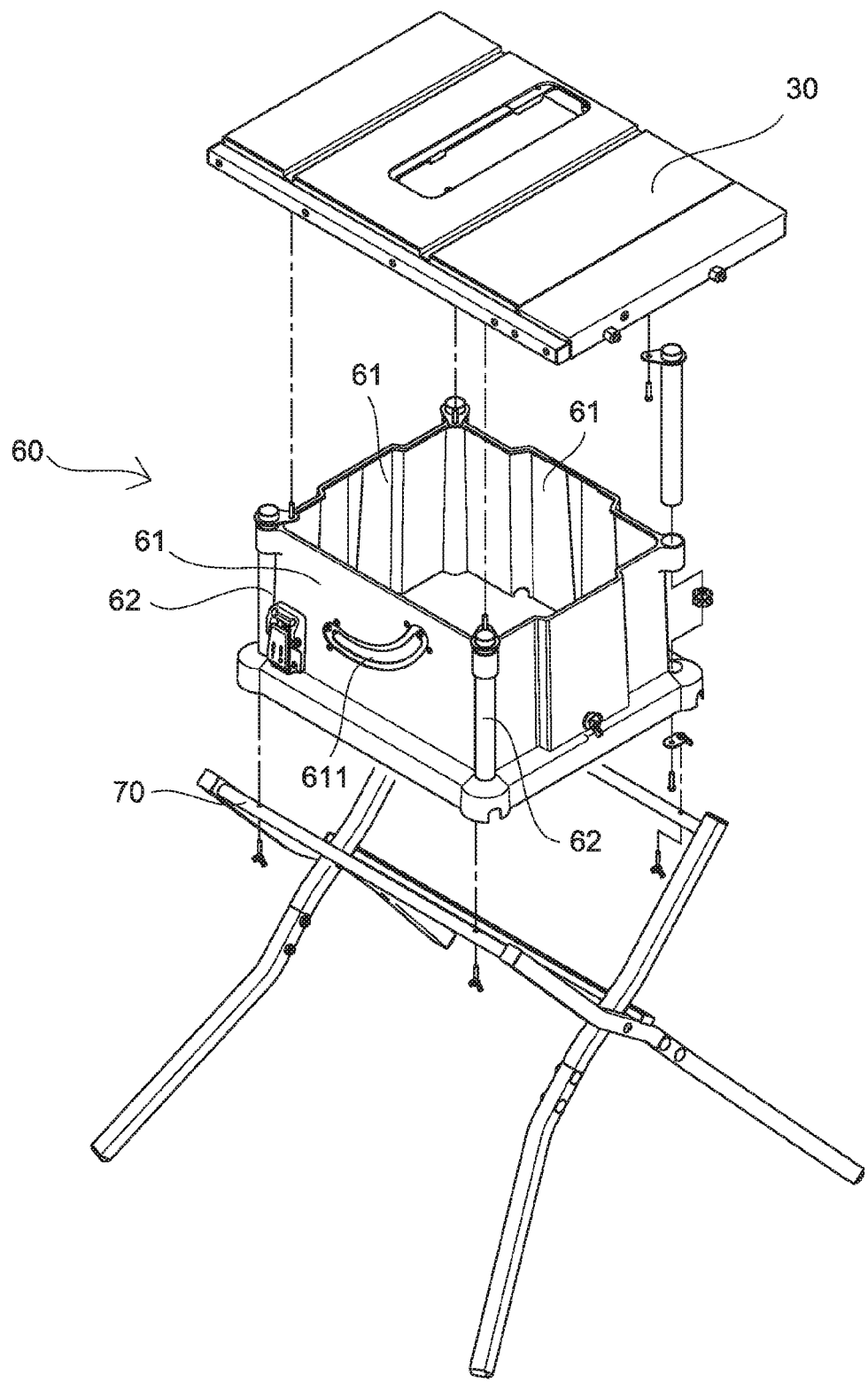
FIG. 2a is an exploded perspective view of the table saw with the folding leg assembly removed.
Figure 3:
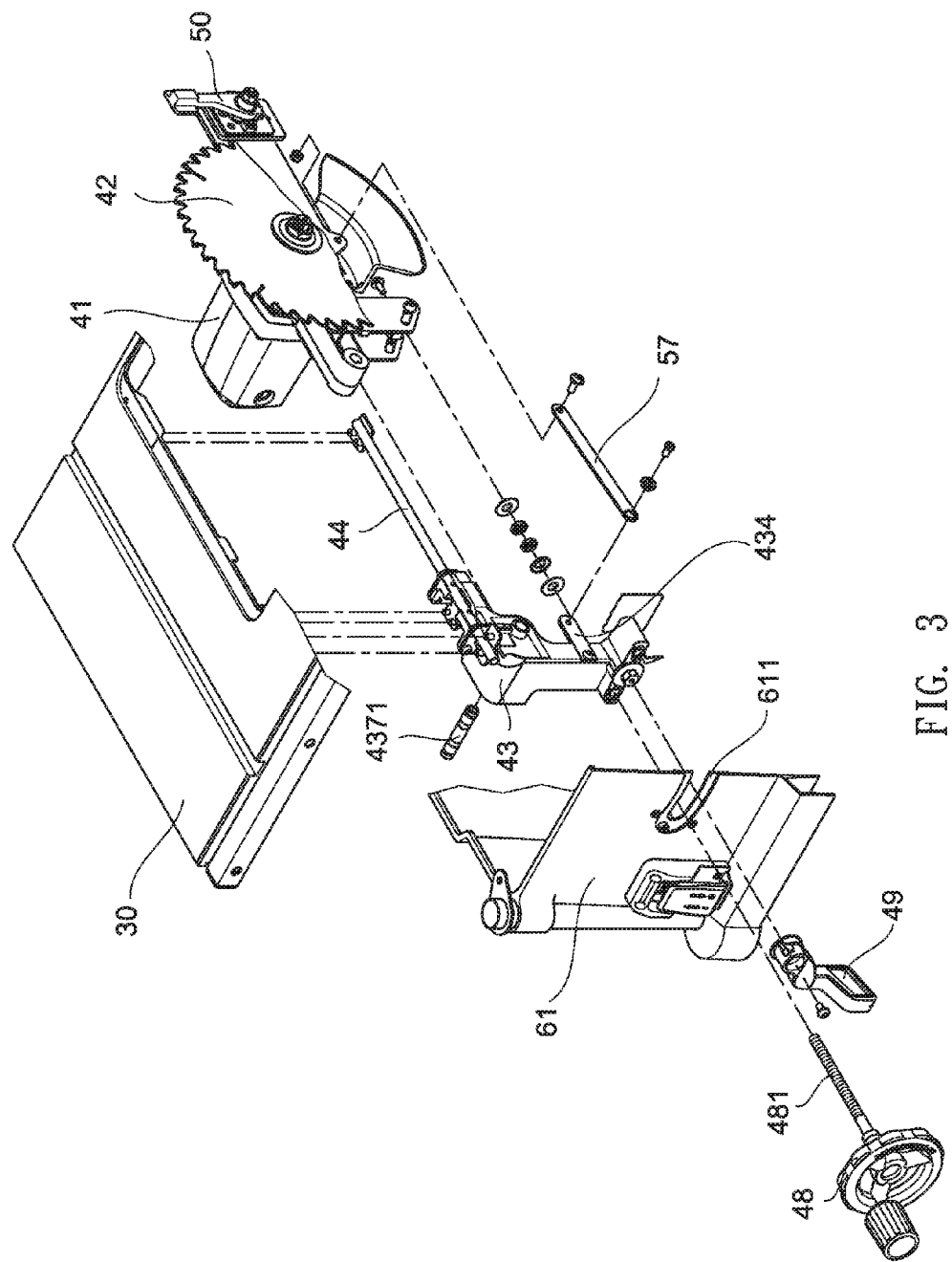
FIG. 3 is an exploded view of the saw assembly and associated table and base.
Figure 4:
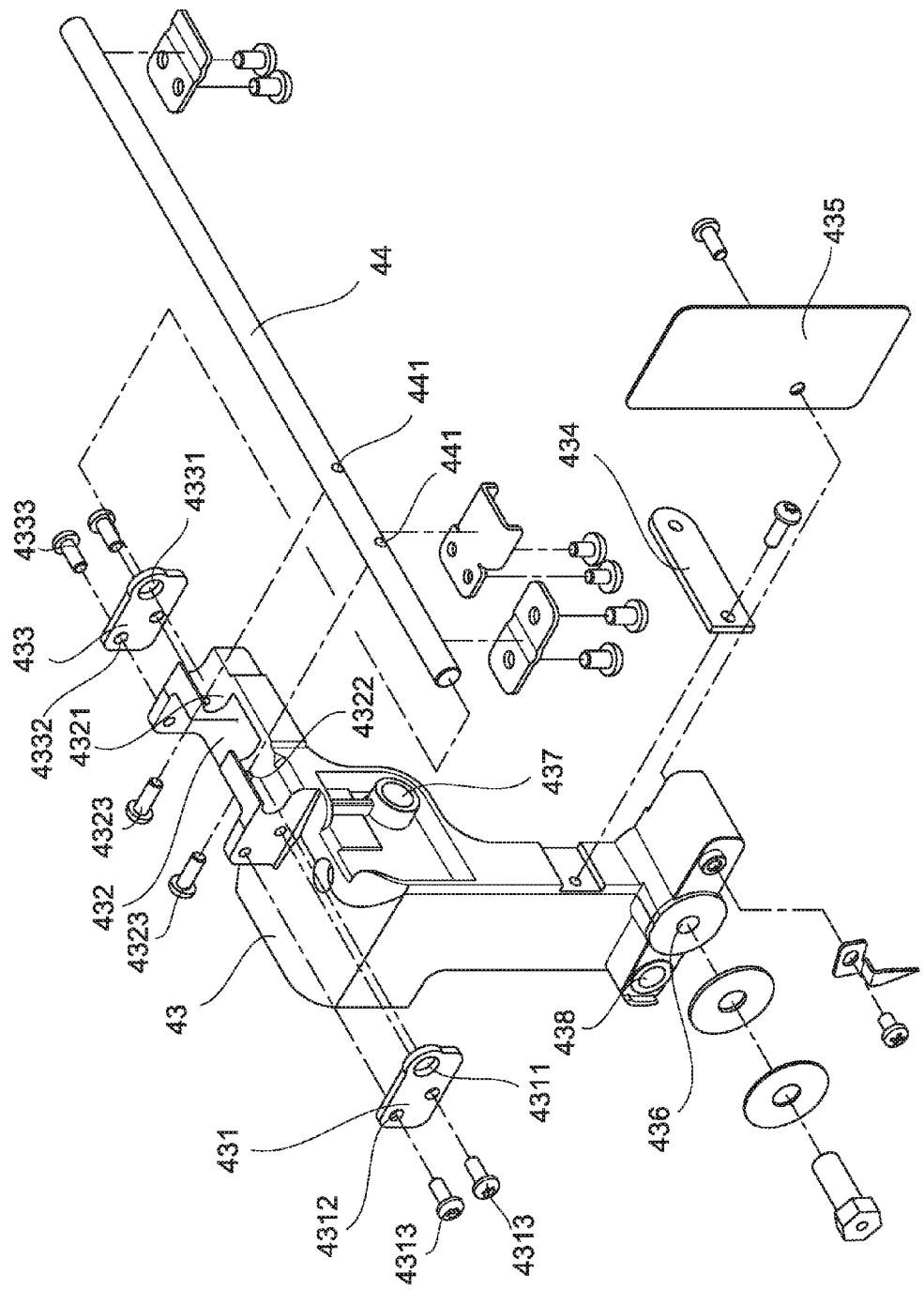
FIG. 4 is an exploded view of the components in a central portion of FIG. 3.
Figure 5:
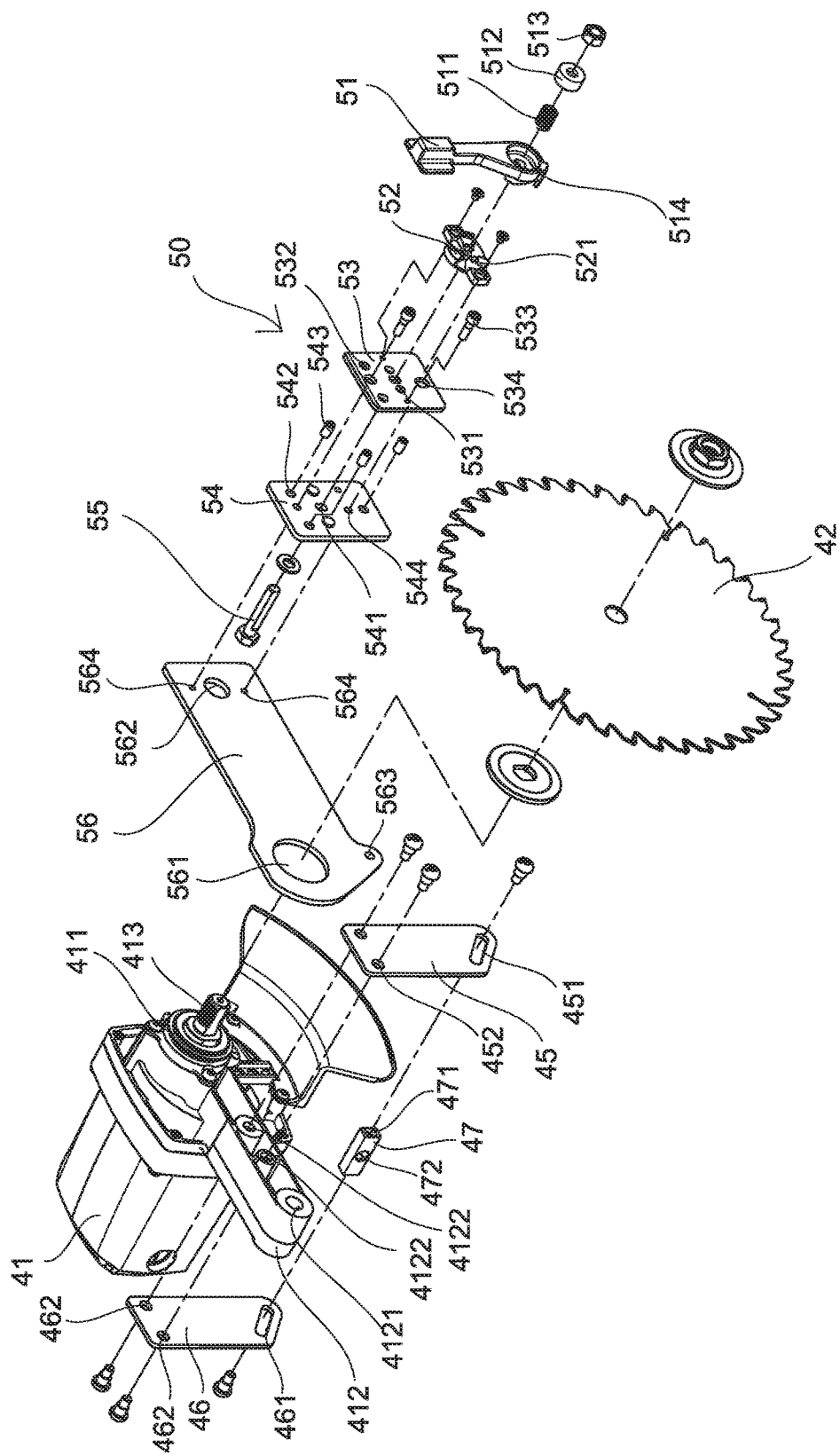
FIG. 5 is an exploded view of the components in a right portion of FIG. 3.
Figure 6:
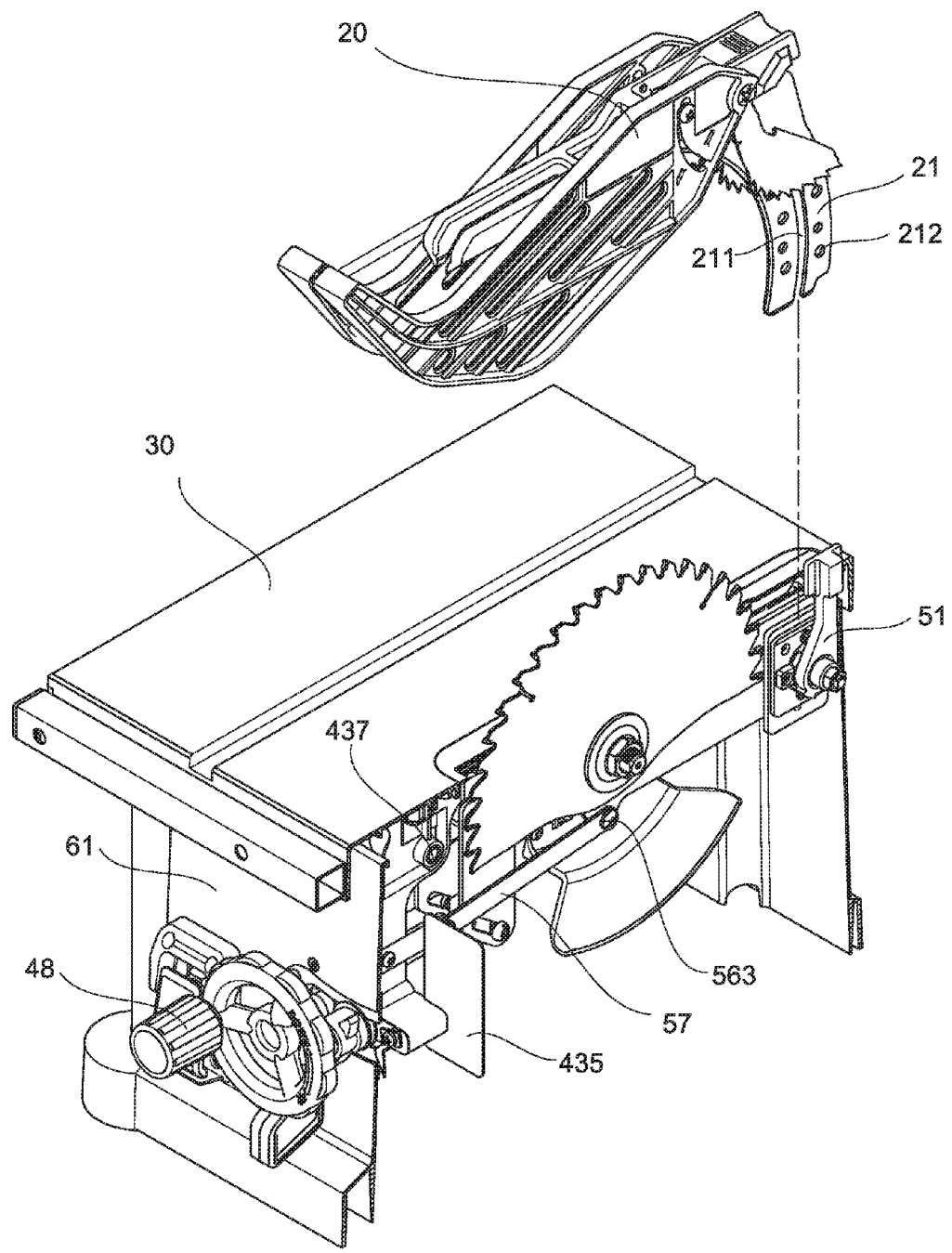
FIG. 6 is a broken away, exploded view of the components in a top left portion of FIG. 1, where the bifurcated member is unlocked.
Figure 7:
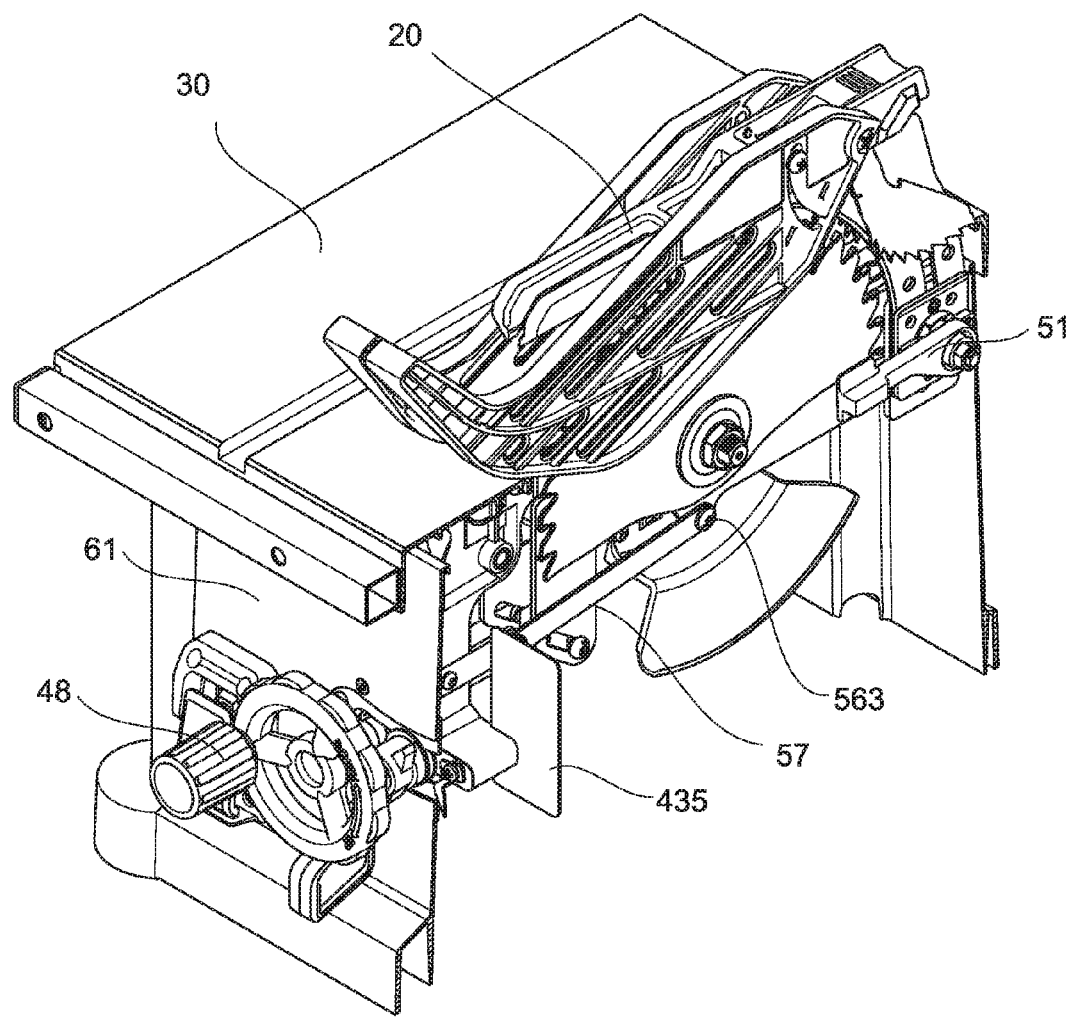
FIG. 7 is a broken away view of the components in a top left portion of FIG. 1.

Referring to FIGS. 1 to 11a, a table saw 10 in accordance with the invention is shown and comprises a hollow, parallelepiped base 60 including four panels 61, an upward curved slot 611 in the front one of the panels 61, and four corner posts 62, a folding leg assembly 70 threadedly secured to the corner posts 62 by means of a plurality of fasteners to fasten the base 60 and the leg assembly 70 together and configured to support the base 60, an upper cutting surface 30 threadedly mounted on the base 60 by means of a plurality of fasteners, a rip fence 31 slidably mounted on the cutting surface 30, a saw guard 20 mounted around an opening 32 of the cutting surface 30 besides the rip fence 31, the saw guard 20 including a curved slot 201 with an upper portion of a downward extending bifurcated member 21 moveably secured thereto so that the saw guard 20 may move back and forth along the slot 201 when the bifurcated member 21 is locked or a portion of the bifurcated member 21 joined the saw guard 20 at the slot 201 may move back and forth along the slot 201 when the saw guard 20 is locked in which the bifurcated member 21 includes an elongated, curved slot 211 and a plurality of holes 212 on either side of the slot 211, a saw assembly extending upward from the opening 32 of the cutting surface 30 to be protected by the saw guard 20 and adapted to cut a substance, e.g., wood, a blade height adjustment mechanism for adjusting height of a circular saw blade 42 extending out of the cutting surface 30, and a saw guard suspension mechanism 50. The saw assembly, the blade height adjustment mechanism and the saw guard suspension mechanism 50 are the subjects of the invention and discussed in detail below.

The blade height adjustment mechanism includes a height adjustment wheel 48 moveably mounted on the slot 611 and having a threaded shaft 481 extending inward, and a lock crank 49 moveably mounted on the slot 611 and adjacent to the height adjustment wheel 48.

The saw assembly comprises a blade suspension mechanism 43 including a hole 436 in a bottom for securing to the lock crank 49, a hole 438 in the bottom for securing to the threaded shaft 481, a plate member 434 on a surface above the bottom, a transverse hole 437 on an upper portion, a recess 432 on a top, a groove 4321 on the top and parallel to the recess 432, a front plate 431 secured to the recess 432 and having a hole 4311, a rear plate 433 secured to the recess 432 and having a hole 4331 aligned with the hole 4311, a rod 44 having one end secured to the groove 4321 and the other end secured to a bottom of the cutting surface 30, and a plate element 435 secured to the bottom; an electric motor 41 having a bossed portion 411, a driving shaft 413, and a link 412 extending forward from the bossed portion 411 and having a first through hole 4121 and two second through holes 4122 between the first through hole 4121 and the bossed portion 411 wherein a fastener 4371 is driven through the transverse hole 437 and the first through hole 4121 to fasten the motor 41 and the blade suspension mechanism 43 together; a first mounting plate 45 having a slanted slot 451 on a bottom and two through holes 452 on a top; a second mounting plate 46 having a slanted slot 461 on a bottom and two through holes 462 on a top; an interconnection 47 having a hole 471 at either end and an intermediate threaded hole 472 wherein a plurality of fasteners are driven through the through holes 452 into the first and second through holes 4121 and 4122 and a plurality of fasteners are driven through the through holes 462 into the first and second through holes 4121 and 4122 to fasten the first and second mounting plates 45 and 46 and the motor 41 together, the threaded shaft 481 is driven into the threaded hole 472, and two fasteners are driven into the slots 451 and 461 into the holes 471 to hold the interconnection 47 between the first mounting plate 45 and the second mounting plate 46 and the interconnection 47 is capable of moving along the slots 451 and 461.

The saw guard suspension mechanism 50 comprises a link plate 56 including a first through hole 561 at an end fastened onto the bossed portion 411 to secure the link plate 56 and the motor 11 together so that the driving shaft 413 may pass through the first through hole 561 to secure to the circular saw blade 42. The link plate 56 further includes a second through hole 563 under the first through hole 561, a third through hole 562 at the other end, and two fourth through holes 564 above and under the third through hole 562 respectively.

The saw guard suspension mechanism 50 further comprises a first plate unit 53 including first, second and third through holes 531, 532 and 534, a second plate unit 54 including first, second and third through holes 541, 542 and 544, a cam member 52 including a central channel 521, a lever 51 including a cam passageway 514 complimentary to the cam member 52, a hollow, cylindrical member 512, and a torsion spring 511 compressed between the cylindrical member 512 and the cam passageway 514, and a link 57 having one end pivotably secured to the plate member 434 and the other end pivotably secured to the second through hole 563. A fastener 543 is driven through the second through holes 532, and the hole 212 of the bifurcated member 21 into the second through hole 542. A fastener 533 is driven through the third through hole 534, the slot 211 of the bifurcated member 21, and the third through hole 544 into the fourth through hole 564. A pivot 55 is driven through the third through hole 562, the first through hole 541, the first through hole 531, the channel 521, the cam passageway 514, the torsion spring 511 and the cylindrical member 512 into a nut 513. As a result, the link plate 56, the second plate unit 54, the bifurcated member 21, the first plate unit 53, the cam member 52, and the lever 51 are assembled. This finishes the assembly of the invention.

It is noted that the blade suspension mechanism 43, the rod 44, the first mounting plate 45, the second mounting plate 46, the link 412, the interconnection 47, and the saw guard suspension mechanism 50 are made of aluminum so that the invention are durable and may cut a material in an increased precision.

Figure 8:
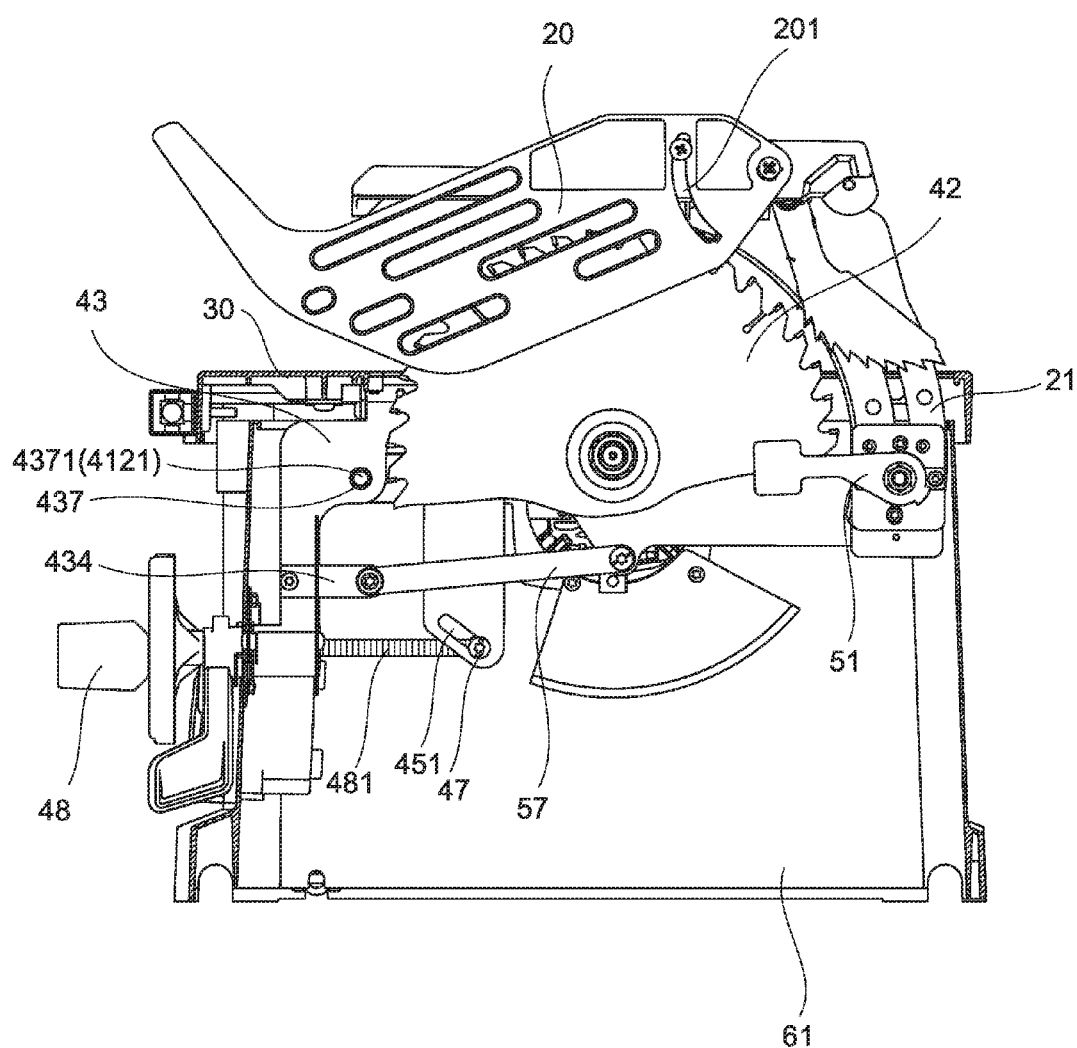
FIG. 8 is a side view of FIG. 7 where the bifurcated member is locked.

As shown in FIG. 8, the bifurcated member 21 is locked by both the first plate unit 53 and the second plate unit 54, the lever 51 is substantially horizontal, the first and second mounting plates 45 and 46 are substantially perpendicular to the threaded shaft 481, a rear end of the link 57 is slightly inclined upward, and the ends of the interconnection 47 engage inner ends of the slots 451 and 461 respectively.

Figure 9:
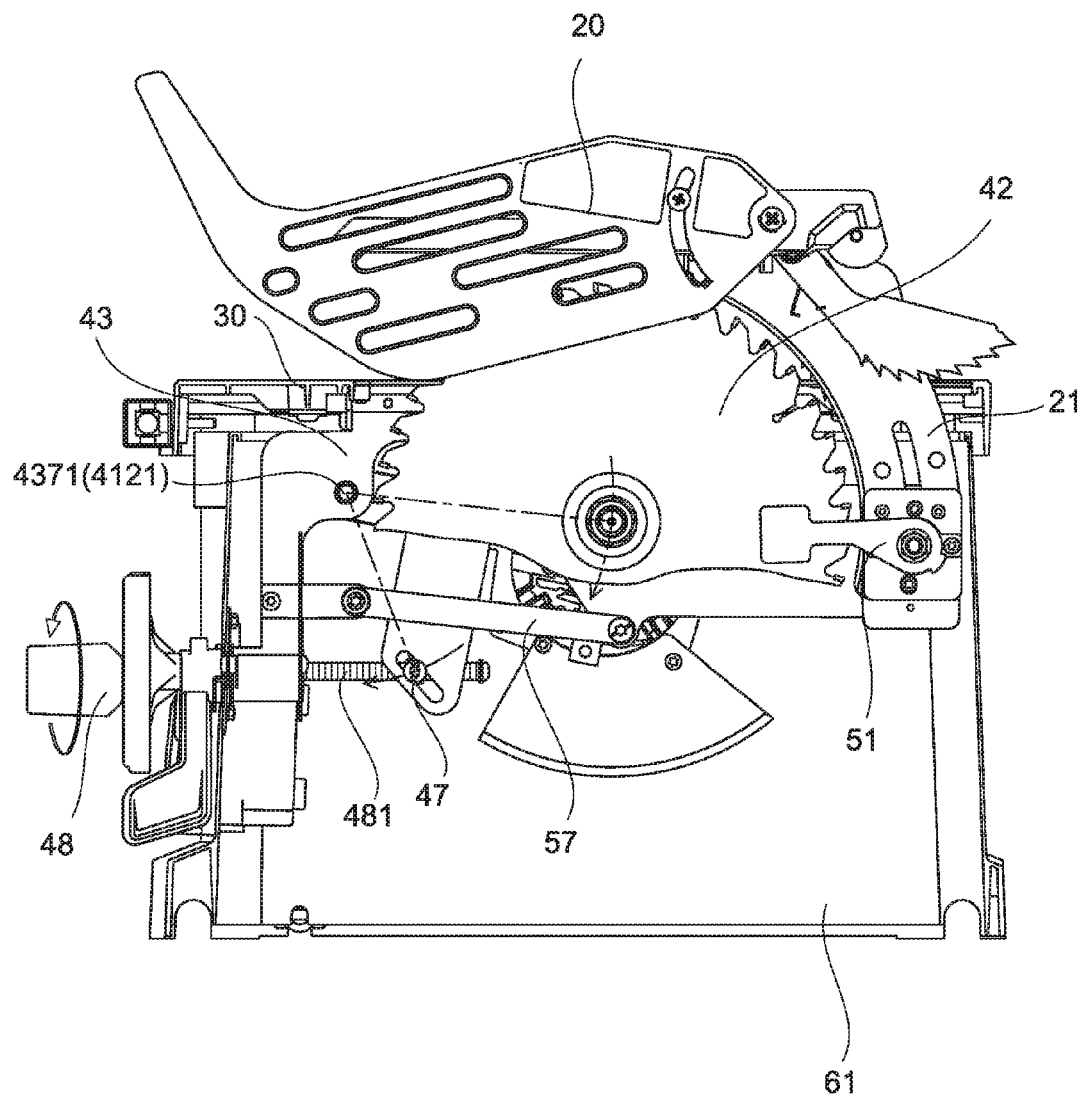
FIG. 9 is a view similar to FIG. 8 showing a blade height adjustment operation.

As shown in FIG. 9, an employee may counterclockwise rotate the height adjustment wheel 48 to move the ends of the interconnection 47 forward, upward along the slots 451 and 461 respectively, thereby moving the motor 41 downward, disposing the rear end of the link 57 slightly inclined downward, to pivot the link plate 56 about the bossed portion 411 so that the bifurcated member 21 secured to the link plate 56 may lower, and disposing the first and second mounting plates 45 and 46 substantially at an angle other than 90 degrees, and the first and second mounting plates 45 and 46 exert force on the link 412 to pivot the link 412 about the fastener 4371, thereby lowering the blade 42. As a result, height of the blade 42 extending out of the cutting surface 30 is adjusted. Also, a front portion of the saw guard 20 lowers and a rear portion thereof moves upward so that the joining portion of the saw guard 20 and the bifurcated member 21 moves downward along the slot 201. It is noted that the bifurcated member 21 is still locked in the position of FIG. 9.

Figure 11:
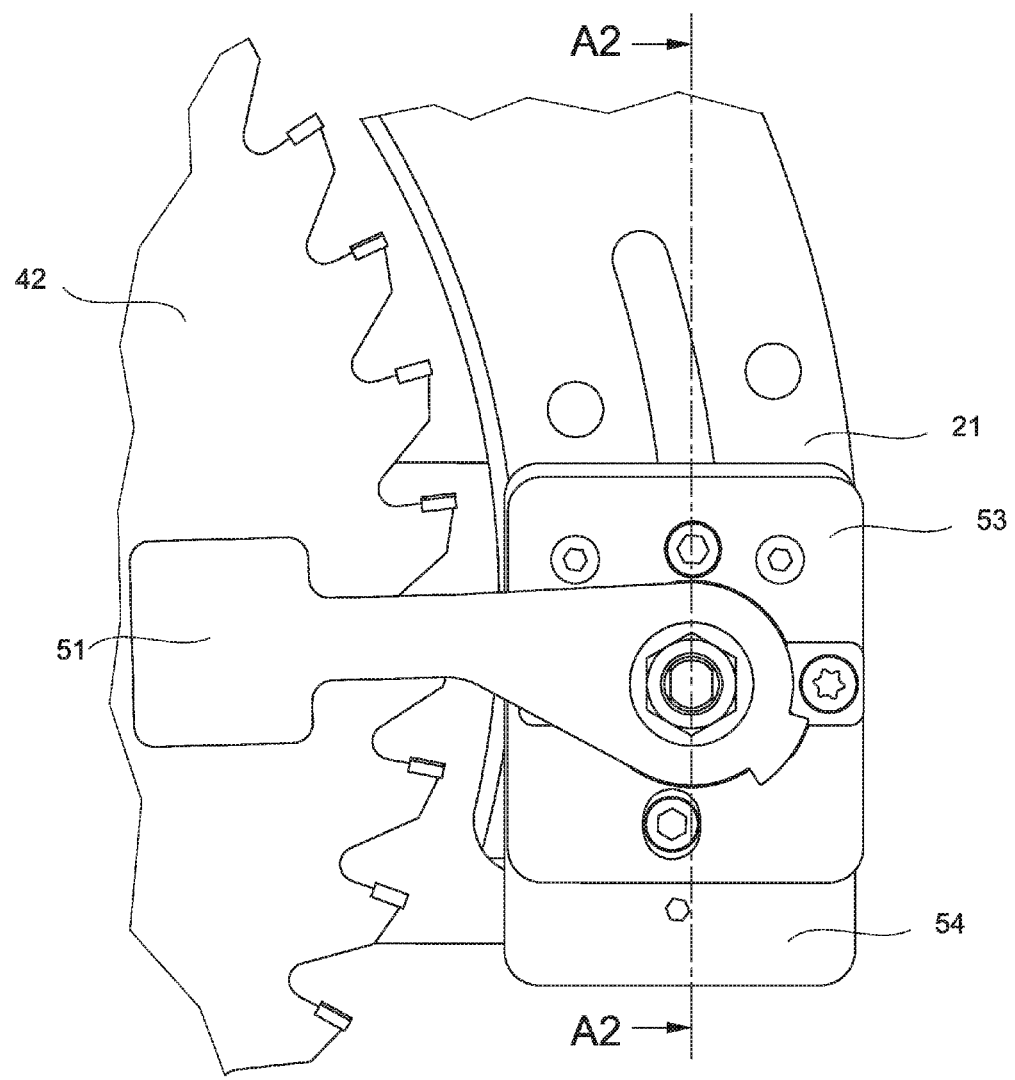
FIG. 11 is a fragmentary view of the right, intermediate portion of FIG. 9 where the lever is disposed in the position for locking the bifurcated member.
Figure 11A:
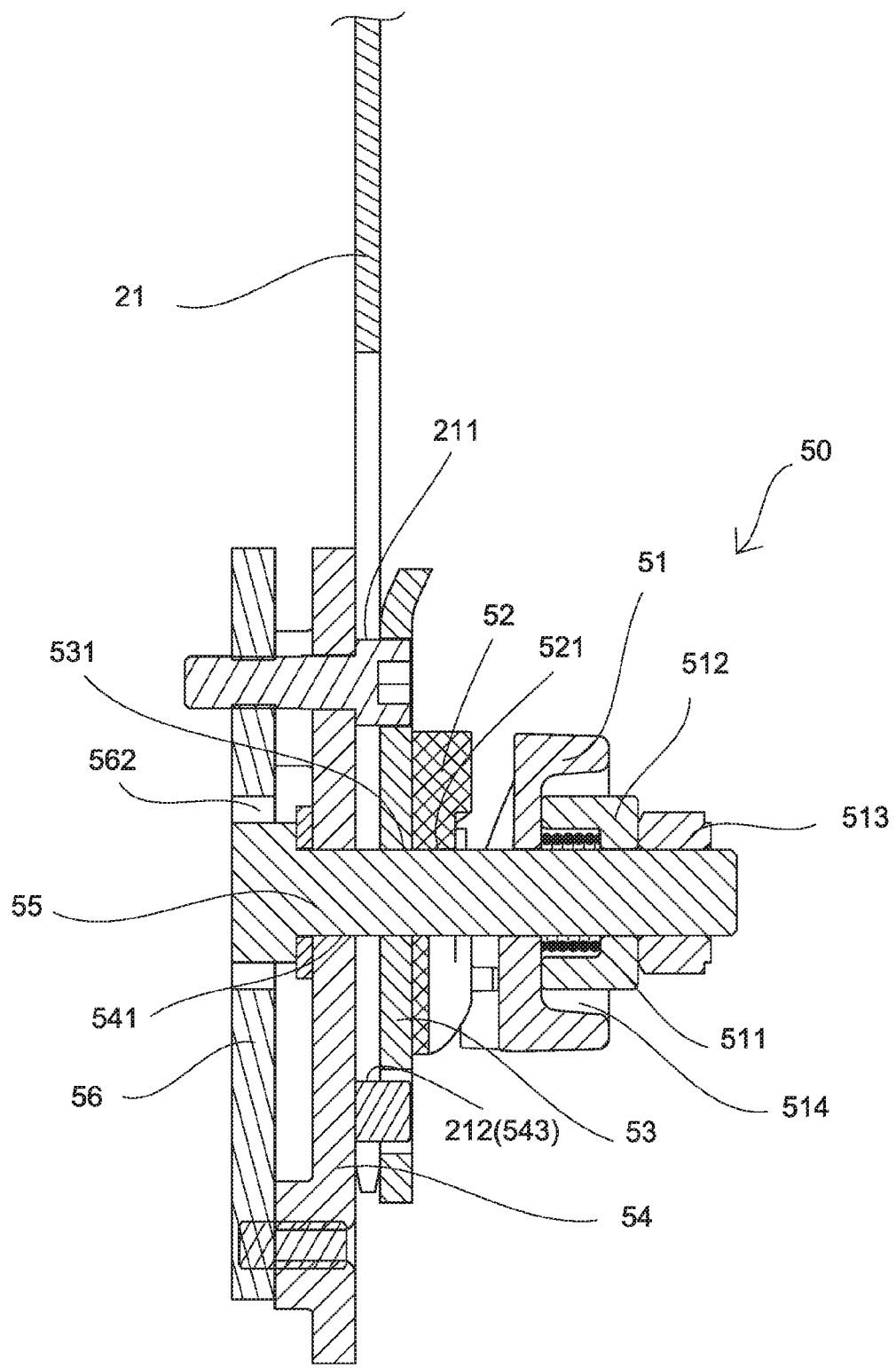
FIG. 11a is a sectional view taken along line A2-A2 of FIG. 11.

As shown in FIGS. 11 and 11a in conjunction with FIGS. 8 and 9, in the locked position the bifurcated member 21 the torsion spring 511 is compressed and the cam member 52 disengages from the cam passageway 514, and the bifurcated member 21 is clamped by both the first plate unit 53 and the second plate unit 54 in a locked position. As a result, the saw guard 20 is locked.

Figure 10:
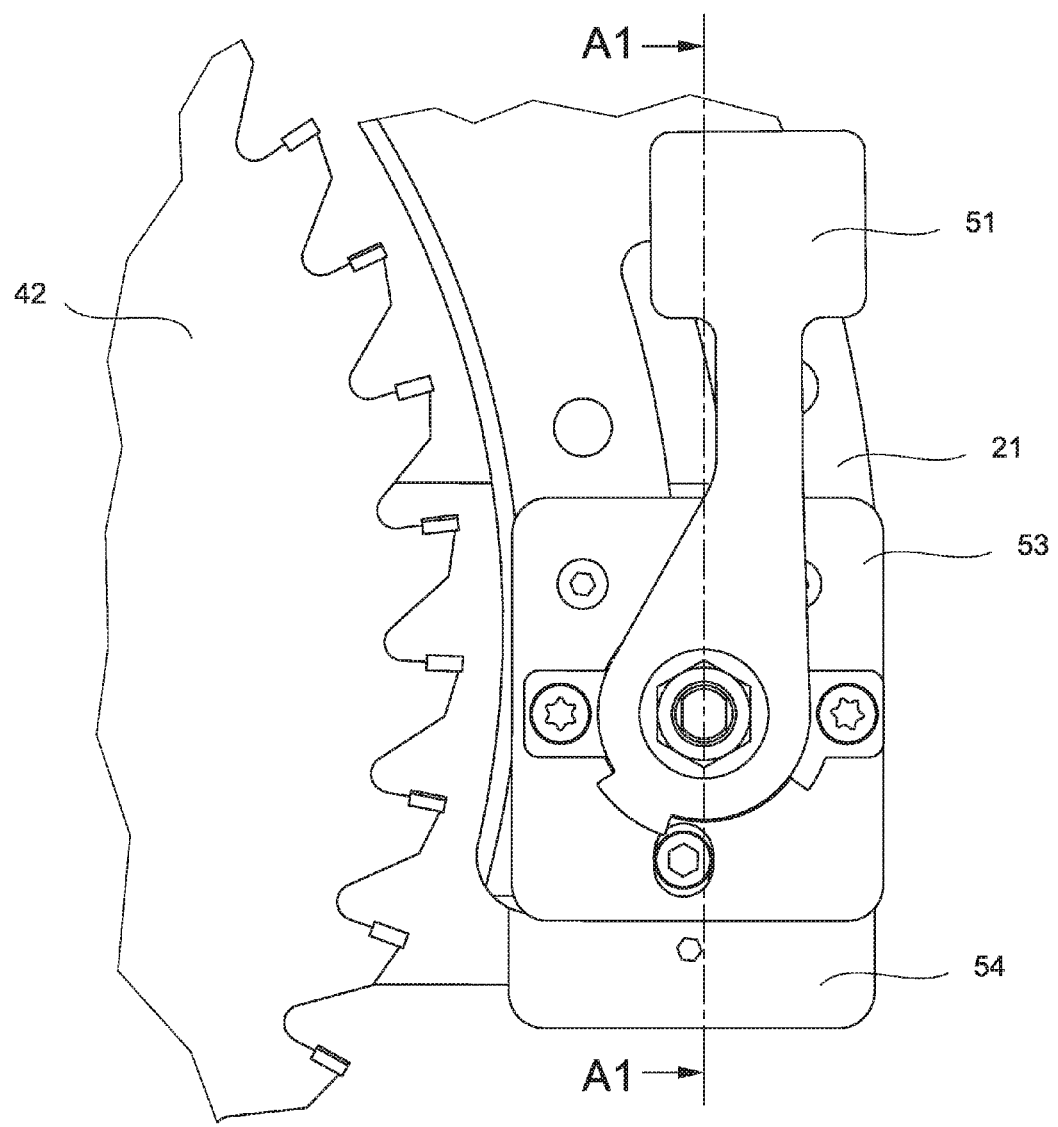
FIG. 10 is a fragmentary view of the right, intermediate portion of FIG. 6 and shows the lever has been clockwise rotated 90 degrees from the position of FIG. 9 to a position for unlocking the bifurcated member.
Figure 10A:
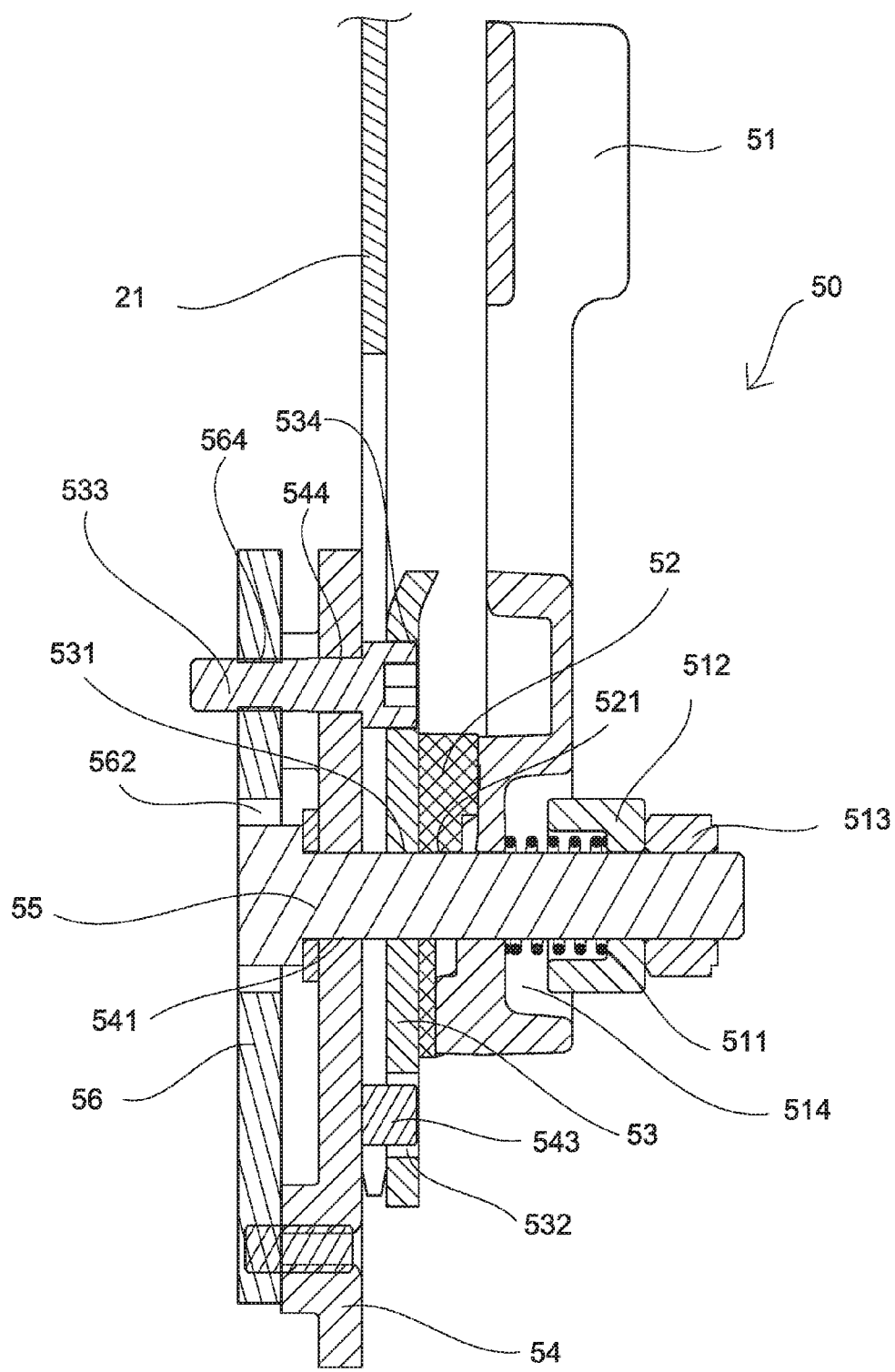
FIG. 10a is a sectional view taken along line A1-A1 of FIG. 10.

As shown in FIGS. 10 and 10a, a clockwise rotation of 90 degrees of the lever 51 from the position of FIG. 11 rotates the cam passageway 514 to urge against the cam member 52, thereby expanding the torsion spring 511 and unlocking the bifurcated member 21. As a result, the saw guard 20 is unlocked.

While the invention has been described in terms of preferred embodiments, those skilled in the art will recognize that the invention can be practiced with modifications within the spirit and scope of the appended claims.

What is claimed is:

1. A table saw comprising:
    a hollow, parallelepiped base including four panels, an upward curved slot member in a front one of the panels, and four corner posts;
    a folding leg assembly releasably secured to the corner posts and configured to support the base;
    an upper cutting surface releasably mounted on the base;
    a rip fence slidably mounted on the cutting surface;
    a saw guard mounted around an opening of the cutting surface besides the rip fence;
    a height adjustment wheel moveably mounted on the slot member and including a threaded shaft extending inward;
    a lock crank moveably mounted on the slot member and adjacent to the height adjustment wheel;
    a blade suspension mechanism secured to the lock crank;
    a rod secured to both the blade suspension mechanism and a bottom of the cutting surface;
    an electric motor including a driving shaft and a link extending forward to secure to the blade suspension mechanism;
    a circular saw blade operatively connected to the driving shaft and aligned with the opening of the cutting surface;
    a first mounting plate secured to the link and including a slanted slot element;
    a second mounting plate secured to the link and including a slanted slot element; and
    an interconnection including two end holes moveably disposed in the slot element of the first mounting plate and the slot element of the second mounting plate respectively, and an intermediate threaded hole secured to the threaded shaft;
    wherein either a rotation of the height adjustment wheel in a first direction moves two ends of the interconnection forward, upward along the slot elements respectively and moves the electric motor downward, or a rotation of the height adjustment wheel in a second direction moves the ends of the interconnection rearward, downward along the slot elements respectively and moves the electric motor upward, thereby adjusting height of the circular saw blade extending out of the opening of the cutting surface
    wherein the blade suspension mechanism includes a bottom hole for securing to the lock crank, a hole element in a bottom of the blade suspension for securing to the threaded shaft, a plate member disposed on a surface above the bottom of the blade suspension, a transverse hole on an upper portion, a recess on a top of the blade suspension, a groove on the top of the blade suspension and parallel to the recess, a front plate secured to the recess and having a hole, a rear plate secured to the recess and having a hole member aligned with the hole, and the rod having one end secured to the groove and the other end secured to the bottom of the cutting surface, and a plate element secured to the bottom of the blade suspension;
    wherein the electric motor further comprises a bossed portion with the link extending forward from the bossed portion;
    wherein the link includes a first through hole and two second through holes between the first through hole and the bossed portion;
    wherein the first mounting plate further comprises two through holes on a top of the first mounting plate;
    wherein the second mounting plate further comprises two through hole members on a top of the second mounting plate;
    wherein a plurality of fasteners are driven through the through holes of the first mounting plate and the through hole members of the second mounting plate into the first and second through holes of the link to fasten the first and second mounting plates and the motor together;
    wherein the link includes a first through hole unit; and
    wherein a fastener is driven through the transverse hole and the first through hole unit to fasten the motor and the blade suspension mechanism together.

* * * * *